Nov. 10, 1953   H. P. LUHN   2,658,599
CLUTCHING MECHANISM
Filed Nov. 25, 1949   2 Sheets-Sheet 2
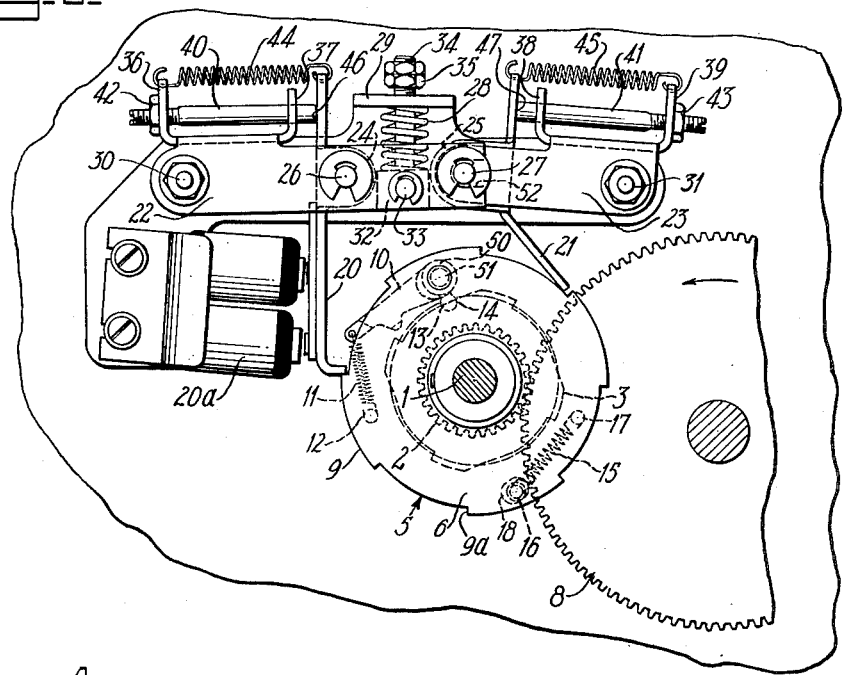
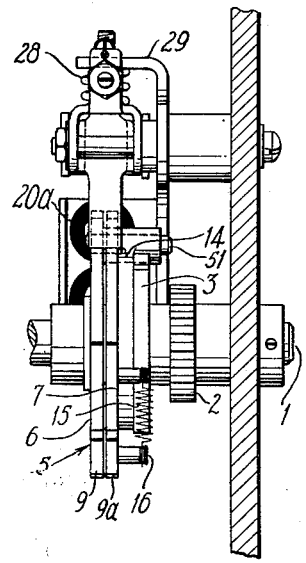
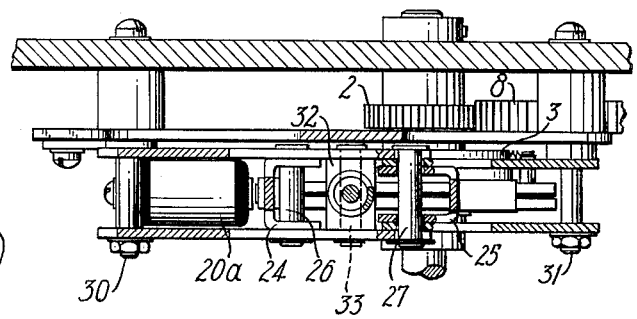
INVENTOR
HANS P. LUHN
BY
ATTORNEY Patented Nov. 10, 1953

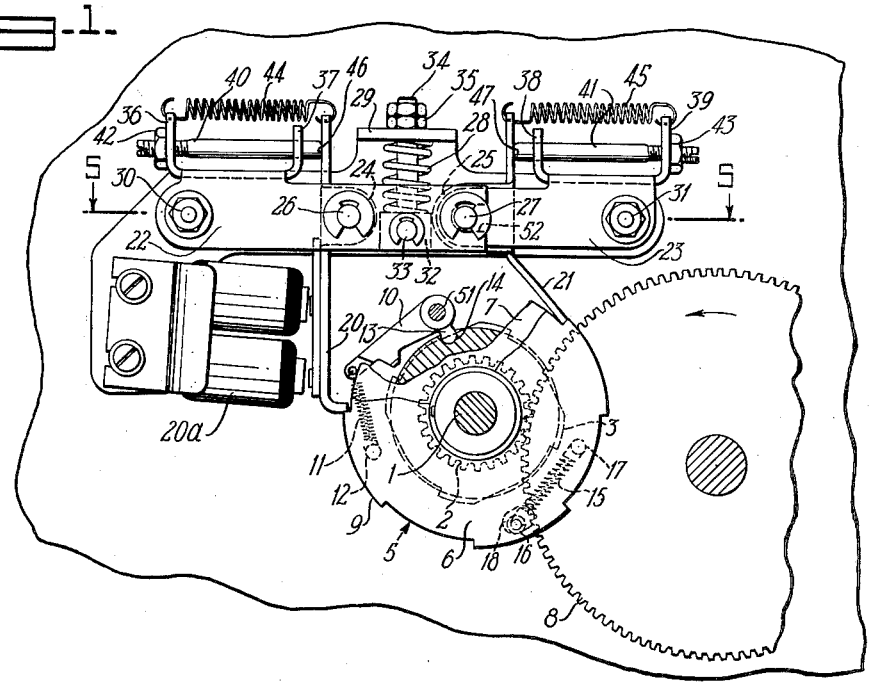

2,658,599

UNITED STATES PATENT OFFICE 2,658,599

CLUTCHING MECHANISM

Hans P. Luhn, Armonk, N. Y., assignor to International Business Machines Corporation, New York, N. Y., a corporation of New York Application November 25, 1949, Serial No. 129,365

2 Claims. (Cl. 192—149)

The present invention relates to improvements on ratchet clutches of the type used for selective rotation of shafts through a machine cycle, a single revolution or fixed parts thereof.

The principal object of the invention is to provide improved means whereby a ratchet clutch keeper will engage in locking position.

A further object of the invention is to provide a keeper, spring urged against the teeth of a driven member and pawl controlled disk, said keeper engaging oppositely cut teeth of both of the members to prevent contrary rotation due to bounce or other causes.

The ratchet clutch of the present invention comprises a driven member and rotatable disk having ratchet teeth disposed about a driving shaft. The operation of the pawl causes engagement or disengagement and is brought about by a differential rotation between the driven member and the rotatable disk thereon. For this purpose the pawl is mounted on the driven member while a finger-like extension on it engages a slot on the rotatable disk. The latter is spring urged into a position where the pawl engages corresponding ratchet teeth on the driving member, while a rotation of the rotatable disk in the direction opposite that of rotation will cause the pawl to disengage from the ratchet.

A stop pawl controlled by any suitable means such as a magnet cooperates with teeth on the driven member as well as the rotatable pawl control disk. When the stop pawl enters the path of the control teeth, the control member is arrested, causing disengagement of the clutch pawl because of the differential movement of the control disk relative to the still rotating driven member. A keeper is provided which engages oppositely cut teeth of both members to prevent contrary rotation due to bounce or other causes.

The residual motion of the driven member to its locked-in position is derived from the momentum of the driven system. The momentum will depend on the nature of the driven system and therefore is a variable factor. When not properly adjusted, the keeper will usually fail to engage, causing chattering as the clutch pawl tries to re-engage each ratchet tooth in succession.

In order to remedy this tendency of ratchet clutches, the following modifications and additions to control elements have been made.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a front view of the assembled clutch and control mechanism showing the driven member in locked-in position.

Fig. 2 is a view similar to Fig. 1 showing the driven member while in a rotating position.

Fig. 3 is a view similar to Fig. 1 showing the driven element just prior to full stopped position.

Fig. 4 is a side elevation view of the assembled clutch and control mechanism taken from the right side of Fig. 3.

Fig. 5 is a sectional view taken on the line 5—5 of Fig. 1.

Referring to Figs 1, 2 and 3 of the drawings, a clutch drive shaft 1 has a gear wheel 2 and a ratchet 3 rotatably mounted thereon. The gear 2 and ratchet 3 are fastened together so that rotation of the gear causes rotation of the ratchet. A drive gear 8 intermeshes with gear wheel 2 to drive ratchet 3 in a clockwise direction. A driven assembly 5 is mounted on shaft 1 and is comprised of a driven member 6 having four teeth 9 and a control disk 7 also having four teeth 9a on the periphery thereof. The member 6 is fixed to the shaft 1 by suitable means, not shown, and the disk 7 is freely mounted upon the shaft. A clutch pawl 10 is pivotally mounted on a stud 51 in driven member 6 and is biased toward engagement with ratchet 3 by means of a spring 11 which in turn is anchored to control disk 7 through pin 12. A clutch pawl extension finger 13 engages slot 14 in a hub portion of the control disk 7.

Engagement and disengagement of clutch pawl 10 with the ratchet 3 is brought about by a differential rotation between the driven member 6 and the control disk 7. A spring 15 which is anchored to pin 16 of the driven member 6 and pin 17 of control disk 7, biases member 6 and disk 7 in opposite directions. Slots 18 and 50 in control disk 7 permit pin 16 and stud 51 to have sufficient play to allow for differential rotation of member 6 and disk 7 from the relative position of Fig. 1 to that shown in Figs. 2 and 3.

In the normal or inactive position of the clutch, member 6 and disk 7 occupy the relative positions wherein their teeth 9 and 9a coincide with one another. The forward edges or sides of a pair of coinciding teeth 9, 9a abut a stop pawl 20 and the trailing edges of another pair of teeth are engaged by a keeper 21. In this position both member 6 and disk 7 are locked against rotation in either direction, and the pawl 10 is held out of engagement with the ratchet 3, as shown in Fig. 1, so that the drive connections from the gear 2 to the assembly 5 are broken. Spring 15 is under tension and biases member 6 counterclockwise and disk 7 clockwise. In addition spring 11 biases pawl 10 counterclockwise about stud 51 and through finger 13 and slot 14 also biases disk 7 in a clockwise direction.

Upon energization of magnet 20a, stop pawl 20 is rocked out of engagement with the member 6 and disk 7, whereupon spring 15 will rock the disk clockwise and spring 11 will rock pawl 10 into engagement with ratchet 3 which in turn, through finger 13 will assist in the clockwise rotation of disk 7 to the extent permitted by the limit to which pawl 10 moves before engaging ratchet 3.

This relative position of the parts is shown in Fig. 2, wherein pawl 10 has been engaged by a tooth of ratchet 3 and the clutch assembly 5 has commenced to turn with the ratchet, to thereby rotate shaft 1 and this rotation will continue until the parts are returned to their relative positions of Fig. 1.

When magnet 20a is deenergized and stop pawl 20 is released and allowed to enter the path of the control disk teeth 9a, control disk 7 is first arrested while member 6 continues to be driven through pawl 10 and ratchet 3. This causes differential movement of control disk 7 relative to the still rotating driven member 6 wherein disk 7 acting through finger 13 will rock pawl 10 out of engagement with ratchet 3. Shortly after clutch pawl 10 has been disengaged from ratchet 3, a tooth of driven member 6 will reach the stopping pawl 20, thus blocking further rotation of the driven member 6. At this time, the keeper 21 drops behind the trailing edges of teeth on the member 6 and the disk 7 for holding them in positions in which their teeth coincide.

It will be appreciated that a disengagement of the pawl 10 from the ratchet 3 results in a breaking of the drive connections from the gear 2 to the member 6. If the keeper 21 did not engage the trailing edge of a tooth on the member 6, the springs 11 and 15 would cause this member to turn in a counterclockwise direction relative to the disk 7 until the pawl 10 engaged the ratchet 3 once more. The keeper also acts to prevent any counterclockwise movement of the member 6 and the disk 7 due to bounce or other causes.

The motion of the driven member 6 to its locked-in position after the pawl 10 is disengaged is derived from the momentum of the driven system, and this momentum is sufficient to overcome the action of the springs 11 and 15 until the final interlocked position is reached. When not properly adjusted, keeper 21 will usually fail to engage, causing chattering as the clutch pawl tries to re-engage each tooth of ratchet 3 in succession.

In order to remedy this tendency of ratchet clutches and at the same time to improve the operation of the clutch generally, improvements have been made on the control elements.

Arms 22 and 23 are pivotally mounted on a suitable fixed support at 30 and 31 respectively. Stop pawl 20 has a bifurcated extension 24 and keeper 21 has a similar extension 25. Pivot pins 26 and 27 mount extensions 24 and 25 to the free ends of arms 22 and 23 respectively. The free ends of the two stud-carrying arms 22 and 23 face each other in such a manner that the fixed studs 30 and 31 on which these arms rotate and the studs 26 and 27 serving as pivots for the stop pawl 20 and keeper 21 are substantially in line. The two arms 22 and 23 are interconnected by a fork 52 at the free end of stop pawl arm 22 engaging the stud 27 used for holding the keeper 21 on arm 23. As a consequence, any movement of the one arm is translated to the other arm and their ends will jointly move away from or toward the center of the clutch pawl control disk 7. This construction permits the pawl 20 and keeper 21 to be displaced in a generally tangential direction with respect to the periphery of the clutch pawl control disk 7.

Arms 22 and 23 have integral brackets 36, 37 and 38, 39 respectively. These brakets support pins 40 and 41 which are manually settable by means of nuts 42 and 43 and serve as stops for the stop pawl and keeper. Spring 44 is connected to bracket 36 and stop pawl 20 for holding the latter against pin 40 at 46 thereby urging said pawl to a position for engagement by the teeth of the driven member 6 and the pawl control disk 7. Spring 45 functions similarly and is connected to bracket 39 and keeper 21 for holding the latter against pin 41 at 47.

At the moment the stop pawl 20 is engaged by a tooth on the clutch control disk 7, the momentum transmitted to the pawl 20 lifts it slightly (as shown in Fig. 3) and results in the rotation of the arm 22 on which it is pivoted. This rotation is opposed by compression spring 28 interposed between block 32 (which is pivotally connected to arm 22 by means of stud 33) and fixed support 29. Block 32 carries threaded rod 34 upon which spring 28 is mounted. Nut 35 is threaded on rod 34 and serves as a manually adjustable stop for limiting travel of the arm 22 in a clockwise direction. Because of this yieldable supporting means, the sudden shock of the arresting stop pawl 20 is dampened by this compression spring which, after the arm 22 has been momentarily displaced, will restore the arm to its normal position. The slight rotation of arm 22 is transmitted to the arm 23 carrying the keeper 21, causing it to rotate proportionately.

As a result, the lower end of the keeper will be tangentially displaced with respect to the control disk 7, as shown in Fig. 3, thereby offering the backward-cut teeth a substantial clearance and facilitating the keeper 21 to clear these teeth and assume its locking position. As the arms 22 and 23 return to their normal position of Fig. 1 under the force of compression spring 28, the stop pawl 20 and keeper 21 also are forced back into their normal position, thereby taking up the slack previously caused by their rotation and aligning the teeth of the control disk 7 and the driven member 6 into a locked, disengaged position. It is seen from Figs. 1, 2 and 3 that the tip of pawl 20 is tangent to the periphery of control disk 7 when the pawl is moved into locking position. The effective pivot point of pawl 20 is the point directly to the left of pivot pin 26 where the bifurcated extension 24 meets the straight body portion of the pawl. A straight line connecting the tip of the pawl 20 and the effective pivot point of the pawl remains tangent to the periphery of the disk 7 throughout the travel of pawl 20 upon movement of the keeper 21 to the locking position.

Briefly summarizing, the clutch is provided with a stop pawl 20 and a keeper 21 whose disk-contacting edges are normally spaced apart as in Fig. 1, a predetermined distance measured along the periphery of the disk 7 and member 6. Upon stopping engagement of the parts by pawl 20, the inertia of the driven elements acts upon the pawl and through the linkage connecting it to keeper 21, the latter is also shifted slightly, with the net result that the aforementioned distance is lessened, to provide an excess of clearance between the tooth edges that are to be engaged and thus insure that such engagement will be properly effected.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A wheel having teeth, a stop member engageable with one of the teeth to interrupt advance of the wheel, a keeper spaced from the stop member to engage another tooth to prevent reverse movement of the wheel, a fixed support, a pair of arms pivotally supported on said fixed support, said stop member and keeper each being pivotally mounted at the free end of a separate one of said arms, a linkage including said pivoted arms connecting said stop and keeper and arranged to variably adjust the spacing between the tooth contacting surfaces of said stop and keeper, and resilient means for normally maintaining said adjusted spacing, impact of the wheel against said stop causing the linkage to lessen said spacing against the action of said resilient means, whereby clearance is obtained between the keeper and related tooth, said resilient means acting upon stoppage of the wheel, to restore the stop and keeper to their initial spacing.

2. In a clutch arrangement having a stop pawl and keeper member, a clutch pawl control disk situated in said clutch arrangement, said disk having a plurality of backward-cut teeth located on its periphery, a fixed support, a duo of cooperating arms pivotally supported on said fixed support for effectively moving said keeper to a position to lock said clutch in a disengaged position, a duo of studs, one carried by each cooperating arm, said pawl and keeper member being pivotally mounted on said studs, one of said arms being forked at the free end for receiving the stud carried by the other arm, a compression spring interposed between one arm and said fixed support to oppose the rotation of said arms, means for selectively moving said pawl into the path of said teeth to interrupt advance of said disk, yieldable means for urging said keeper to a locking position, the impact of a tooth against said pawl causing a displacement of said pawl and keeper upwardly with respect to the periphery of said clutch pawl control disk against the action of said compression spring, whereby said compression spring acts upon stoppage of the disk to move said keeper in a tangential direction with respect to the periphery of said disk and to move said pawl in a direction along a line of tangency to the periphery of the said disk, said line of tangency running through the tip of said pawl and the effective pivot of said pawl, upon movement of said keeper to the locking position.

HANS P. LUHN.

References Cited in the file of this patent

UNITED STATES PATENTS

| Number | Name | Date |
|---|---|---|
| 1,409,837 | Eames | Mar. 14, 1922 |
| 1,429,404 | Lard | Sept. 19, 1922 |
| 2,161,563 | Doty et al. | June 6, 1939 |
| 2,512,738 | Dixon et al. | June 7, 1950 |

FOREIGN PATENTS

| Number | Country | Date |
|---|---|---|
| 755,876 | France | Dec. 1, 1933 |